G. R. BOTT.
MIXING AND AERATING DEVICE.
APPLICATION FILED FEB. 21, 1921.
1,399,740.
Patented Dec. 13, 1921.
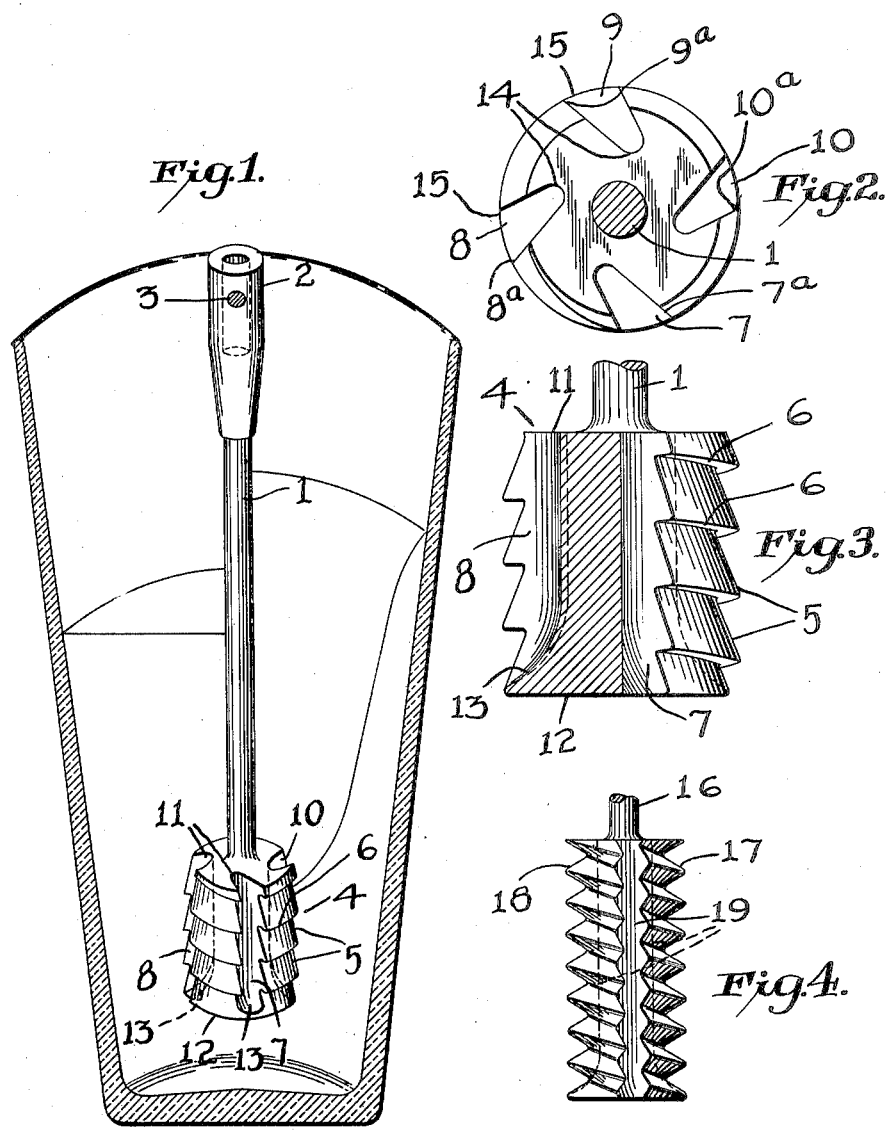
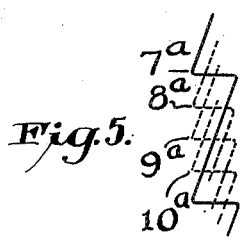

UNITED STATES PATENT OFFICE.

GEORGE R. BOTT, OF MOUNT VERNON, NEW YORK.

MIXING AND AERATING DEVICE.

1,399,740.  Specification of Letters Patent.  Patented Dec. 13, 1921.

Application filed February 21, 1921. Serial No. 446,536.

*To all whom it may concern:*

Be it known that I, GEORGE R. BOTT, a citizen of the United States, residing at 440 Nuber avenue, Mount Vernon, Westchester county, N. Y., have invented certain new and useful Improvements in Mixing and Aerating Devices, of which the following is a specification.

My invention relates to a mixing and aerating device for liquids and miscibles and more particularly to a sanitary spindle of simple construction so constructed that when driven by a motor it will efficiently mix the liquid or miscible, at the same time aerating it, mixing air into the liquid or miscible in quantity and in a finely divided state.

One of the objects of my invention is to provide a solid mixing head that can be easily cleaned and which has no inaccessible places or traps that can be clogged. Another object is to provide such a spindle head with a plurality of spirals upon its exterior so constructed as to propel the liquid and circulate it.

A further object is to provide a solid spindle head with spirals for propelling the liquid or miscibles and with a number of channels around its outside surface intersecting the spirals so as to promote the aerating and mixing action.

With the above and other objects in view my invention consists in the parts, improvements and combinations more fully pointed out hereinafter.

Turning now to the drawing which illustrates two embodiments of the invention,

Figure 1 illustrates an isometric view of the spindle head mounted upon its stem. The lower left half of Fig. 1 illustrates the liquid at rest and the lower right half illustrates the liquid while being stirred.

Fig. 2 is a transverse section through the stem of Fig. 1, looking down upon the top of the spindle.

Fig. 3 is a vertical cross section of the spindle shown in Fig. 1, partly in elevation.

Fig. 4 is a front elevation of another form of the invention in which two spirals are used.

Fig. 5 is a diagrammatic detail view.

The spindle head is mounted upon a stem 1 which may be secured to the shaft of the driving motor (not shown) by means of a coupling 2 and set screw 3. The lower end of the stem carries the spindle head 4. The spindle head is solid and its exterior is provided with one or more spiral turns 5. In the embodiment of the invention shown in Figs. 1 and 3, the spirals make four turns about the axis of the spindle, giving four propelling faces 6 to the spirals. The form of the spiral may be varied but as shown the propelling faces are broad and flat and lie in a helical path at an angle of somewhat less than 90 degrees to the axis of the spindle. The pitch of the spiral, that is to say, the number of turns for each inch of length along the axis of the spindle, may be varied, as well as the length and inclination of the side faces 5 of the turns.

In accordance with my invention, I provide one or more longitudinal channels on the exterior of the spindle head, preferably a plurality of channels, which intersect the spiral turns. In the embodiment of the invention illustrated, I have shown four of such channels 7, 8, 9, 10. These channels thus form spaces or cutaway portions in the exterior of the spindle. The channels extend parallel to the axis of the spindle and preferably from the top to the bottom. In the form of the invention illustrated, the mouths 11 of the channels communicate with the space adjacent the stem. The channels in the embodiment of the invention illustrated, terminate adjacent to the plane of the lower end 12 of the spindle head without passing through the end. As illustrated and shown in Figs. 1 and 3, the channels as they approach the lower end are curved or shaped as at 13 so that the floor of the channel is somewhat concave. As is clearly shown in Fig. 2, the channels widen as they approach the exterior of the spindle head, the inner portion 14 of the channels being narrower than the outer portions 15. In the best embodiment of the invention the axial planes of the channels or what may be called the directions of the channels are inclined in the direction of rotation, the direction of rotation being indicated by the arrow in Fig. 2. The channels extend inwardly and do not intersect the axis of the spindle but their axial planes are tangentially arranged with reference to a circle struck from the center of the spindle and of smaller diameter than the exterior of the spindle.

It will be observed that by the combination of the longitudinal channel and the spirals which they intersect, a plurality of teeth or attacking points are provided on the rearward side of the groove where the spirals have been cut away. In the present instance in which four channels are provided, there are four such attacking points 7ª, 8ª, 9ª, 10ª for each turn of the spiral, that is to say, the spiral will attack the liquid at four points during each revolution. The ends of the spirals where they reach the channel, are constantly bombarding the mixture of air bubbles and liquid so that it is thoroughly mixed and the air broken up into finer or smaller bubbles. This greatly increases the agitating and aerating effect.

In the form shown in Fig. 4 the stem 16 carries the spindle at its lower end upon which two left-hand spirals 17, 18 are provided. The channels 19 extend from the top to the bottom of the spindle with their mouths and discharge spouts as before. The spirals have V-shaped threads.

In Fig. 5 is illustrated the action of the attacking edges of each spiral during one turn, with reference to four channels as illustrated in Fig. 1. The dotted lines show the successive positions of the backs of four attacking teeth 7ª, 8ª, 9ª, 10ª during one turn of the spiral as the teeth cross an axial element.

With the spindle revolving at high speed and in the direction of the arrow, the spiral being disposed upon it with a left-hand thread, the liquid is drawn down toward the spindle end during the first operation, like a liquid nut. Thereupon a vortex in the liquid is formed, as illustrated in Fig. 1, which reaches the spindle head. At the same time the channels on the side of the spindle head which have concave bottoms or discharge spouts, draw in the air from the top of the spindle through the mouths of the channels, as soon as the vortex has been formed, the device working like a centrifugal pump. The open sides of the channel are more or less closed by the overlapping liquid. The air is expelled at various points along the channels and is continually bombarded and mixed with the liquid. As the spindle revolves, the body of liquid is also revolved in the same direction, but not to anything like the same rate. Air is more or less taken from the inside of the vortex in the bottom and is broken up and forced into the liquid.

Having thus described the construction, the operation will be clear.

What I claim and desire to secure by Letters Patent is:

1. A mixing and aerating device for liquids comprising a solid spindle, said spindle having a solid core and provided on its exterior with an interrupted spiral and a plurality of parallel continuous channels, each intersecting the successive turns of the spiral, said channels extending inwardly below and beyond the spirals into the solid core of the spindle.

2. A mixing and aerating device fo liquids comprising a spindle, said spindl provided on its exterior with a number o annular ridges and one or more longitudina channels intersecting successive ridges, sai channels intersecting the ridges and extend ing into the spindle head below the ridge thus forming a groove or grooves runnin lengthwise of the spindle, said groove o grooves having a continuous floor and sides interrupted by the ridges.

3. A mixing and aerating device for liquids comprising in combination a spind e head, a stem upon which said spindle head is mounted, said spindle head provided on its exterior with a propelling spiral making a number of turns about the spindle and a plurality of longitudinal channels each intersecting the successive turns of the spiral, said channels extending from the top to the bottom of the spindle head, the mouths of the channels communicating with the space adjacent the stem.

4. A mixing and aerating device or liquids comprising in combination an elongated spindle head, a stem upon which said spindle head is mounted, said spindle head provided on its exterior with a propelling spiral making a number of turns about the body of the spindle head, one or more longitudinal channels each intersecting the successive turns of the spiral, said channels curved at the bottom and extending from the top to the bottom of the spindle head, the mouths of the channels communicating with the space adjacent the top of the spindle head.

5. A mixing and aerating device for liquids comprising in combination an elongated spindle head, said spindle head provided on its exterior with a spiral and a plurality of longitudinal channels intersecting the turns of the spiral, said channels each having a continuous portion running lengthwise of the spindle and terminating adjacent to but not passing through the lower end of the spindle head.

6. A mixing and aerating device for liquids comprising in combination an elongated spindle head, said spindle head provided on its exterior with a propelling spiral and a plurality of inwardly extending longitudinal channels each intersecting the successive turns of the spiral, said channels forming elongated grooves with continuous floors extending from one end to the other of the spindle head.

7. A mixing and aerating device for liquids comprising in combination an elongated spindle head, said spindle head provided on its exterior with a propelling spiral having a plurality of turns and a plurality of inwardly extending longitudinal channels each intersecting the turns of the spiral, said channels terminating adjacent to the plane of the lower end of the spindle head, the mouths of the grooves communicating with the space adjacent to the upper end of the spindle head.

8. A mixing and aerating device for liquids, comprising a spindle provided on its exterior with a number of propelling spirals, making a plurality of turns about a spindle, said spindle having on its exterior a plurality of longitudinal channels, each with a continuous floor intersecting the spirals and extending below the spirals and into the spindle core, the axial planes of the channels being tangentially arranged with reference to a circle struck from the center of the spindle and of smaller diameter than the exterior of the spindle.

9. A mixing and aerating device for liquids, comprising a spindle head provided on its exterior with a number of propelling spirals, making a plurality of turns about a spindle head, said spindle head having on its exterior a plurality of longitudinal channels intersecting the spirals, the channels having flaring discharge spouts at the end of the spindle head and mouths at the top, the axial planes of the channels being tangentially arranged with reference to a circle struck from the center of the spindle head and of smaller diameter than the exterior of the spindle head.

10. A mixing and aerating device for liquids comprising in combination a spindle head having an elongated, cylindrical body, the said body provided on its exterior with a propelling spiral making a plurality of turns about the body and a plurality of parallel grooves, running lengthwise of the head, each intersecting the successive turns of the spiral, so as to provide a plurality of spirally disposed teeth for each turn of the spiral, for attacking the liquid.

11. A mixing and aerating device for liquids comprising in combination a spindle head having a solid cylindrical body, the said body provided on its exterior with a propelling spiral making a plurality of turns about the body, the spirals being intersected by a plurality of grooves, so as to provide a plurality of spirally arranged teeth for each turn of the spiral for attacking the liquid.

In testimony whereof I have signed my name to this specification, in the presence of the subscribing witness.

GEORGE R. BOTT.

Witness:
   ELSIE GREENBERGER.